United States Patent [19]

Thomas

[11] Patent Number: 5,155,919
[45] Date of Patent: Oct. 20, 1992

[54] ECCENTRICITY GAUGE AND ORIFICE PLATE

[76] Inventor: John W. Thomas, 5403 Coach Rd., Bossier City, La. 71111

[21] Appl. No.: 826,409

[22] Filed: Jan. 27, 1992

[51] Int. Cl.$^5$ .............................................. G01B 5/24
[52] U.S. Cl. ...................................... 33/543; 33/555.1
[58] Field of Search ............. 33/543, 542, 544, 542.1, 33/555.1

[56] References Cited

U.S. PATENT DOCUMENTS 2,739,389 3/1956 Carter ................................... 33/543

FOREIGN PATENT DOCUMENTS 0642602 1/1979 U.S.S.R. ................................ 33/543

Primary Examiner—Harry N. Haroian
Attorney, Agent, or Firm—John M. Harrison

[57] ABSTRACT

An eccentricity gauge and orifice plate combination which is used to determine the position of an orifice plate located in an orifice fitting serving a pipeline. In a most preferred embodiment the orifice plate is designed to replace the conventional orifice plate in a conventional orifice fitting and is provided with a hub for lengthening the orifice flow opening to accommodate and stabilize the eccentricity gauge. In a first embodiment the eccentricity gauge includes a dowel pin for insertion in the orifice flow opening, a mount which receives the dowel pin, a dial indicator device adjustably carried by the mount and having a spring-loaded contact point positioned for contact with the inside bore wall of the orifice fitting to measure the eccentricity of the contact point path as the eccentricity gauge is rotated about the orifice flow opening. In a second embodiment of the invention an adjusting bar extends from the mount and receives the dial indicator device in adjustable relationship to accommodate larger orifice plates.

24 Claims, 2 Drawing Sheets

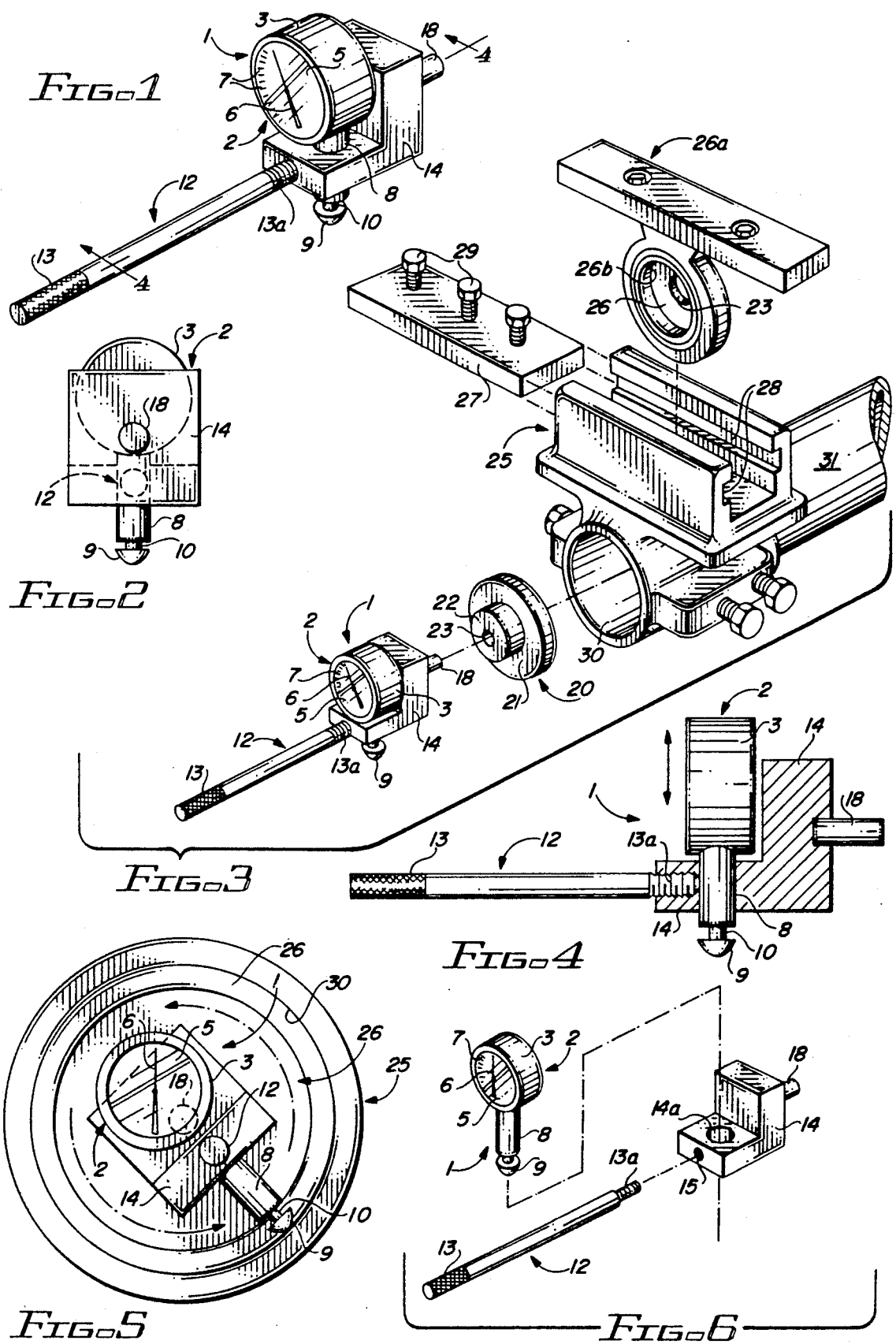

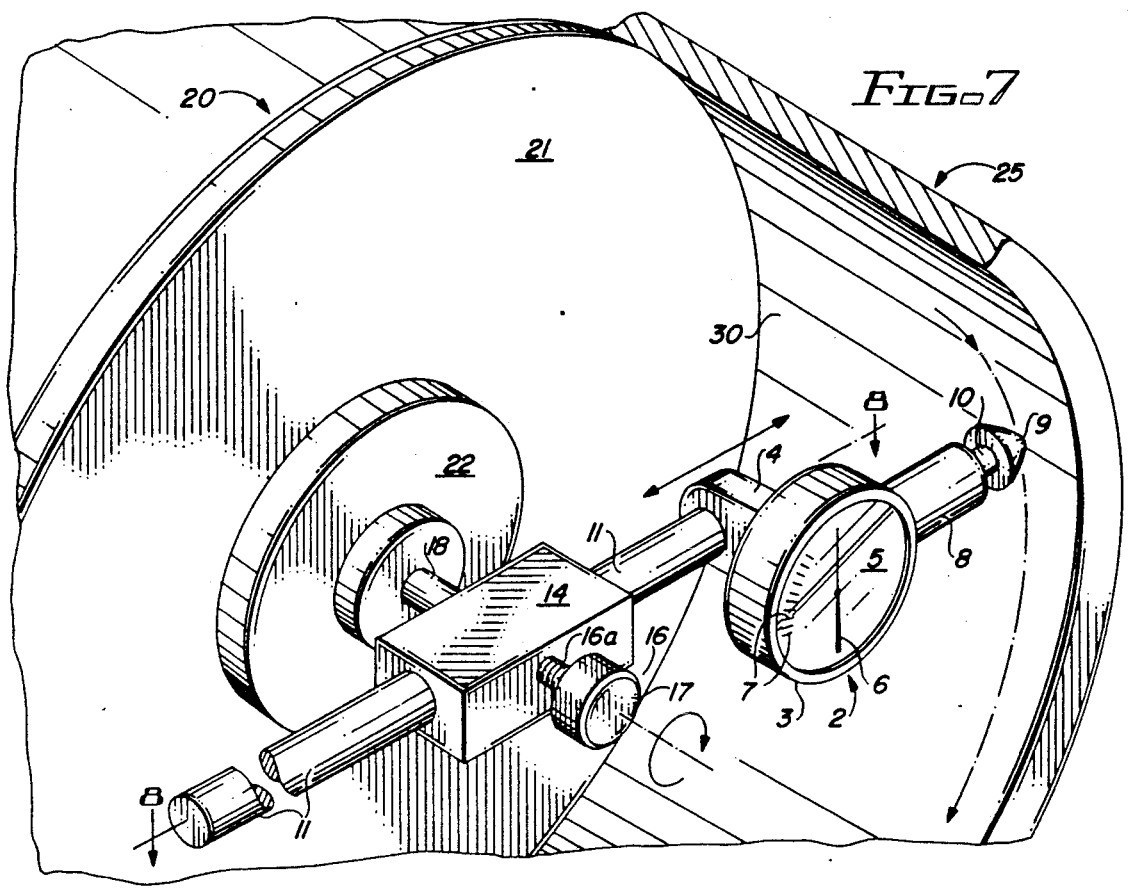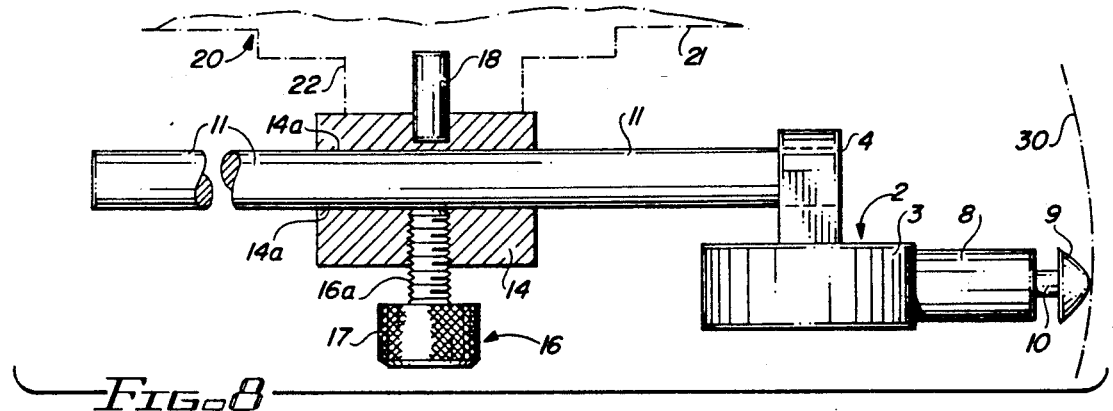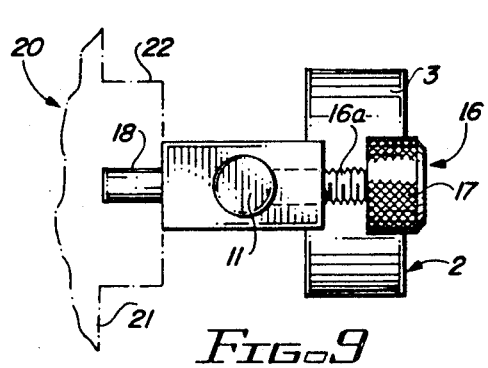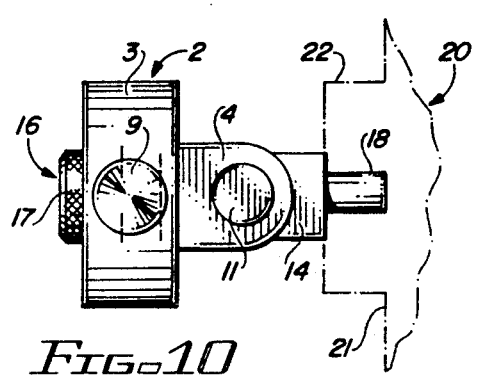

ECCENTRICITY GAUGE AND ORIFICE PLATE

BACKGROUND OF THE INVENTION

1. Field of the Invention

This invention relates to orifice fittings for measuring the flow of fluids, including oil, gas, water and slurries in pipelines. More particularly, the invention includes an eccentricity gauge and a specially designed orifice plate having a projecting hub, which orifice plate is mounted in a conventional carrier designed for insertion in a conventional orifice fitting mounted in a pipeline. Two variations of the eccentricity gauge are each designed with dowel pins sized for insertion in the respective orifice plate flow openings of various sized orifice plates and measuring the eccentricity of a path traced in the internal orifice fitting bore wall. Each eccentricity gauge is designed to measure the eccentricity of a respective orifice plate seated in an orifice fitting having an internal diameter or bore of selected size. In a first preferred embodiment of the invention the eccentricity gauge includes a dowel pin for insertion in the orifice plate flow opening, a mount carrying the dowel pin and adjustably receiving a dial indicator which is fitted with a spring-loaded indicator contact point for engaging the inside surface or wall of the orifice fitting bore and determining the eccentricity of the orifice plate mount by rotation of the eccentricity gauge in a complete circle or ellipse about the dowel pin. This test determines the concentric or off-center, perpendicular or angular position of the orifice plate with respect to the flow path through the orifice fitting. If the orifice plate is properly seated in the orifice fitting perpendicular and concentric to the flow path of the fluid, then the dial indicator will indicate little or no eccentricity in the orifice fitting mount. However, if the orifice plate is slanted or off-center with respect to the flow path in the orifice fitting, the dial indicator will measure the eccentricity of the misalignment, as hereinafter further described.

Conventional orifice fittings are designed to internally mount a carrier which receives a circular orifice plate having a flow opening of selected size to determine the pressure drop across the orifice fitting, and thus, the flow rate of a fluid flowing through a pipeline connected to the orifice fitting. Orifice plates are typically mounted in a rubber seal or O-ring seated in the fittings and are sometimes inadvertently mismounted or improperly seated with respect to the orifice fitting and the pipeline, such that the orifice plate is not perpendicular to the flow path of the fluid flowing through the pipeline or concentric with the bore of the orifice fitting. This misalignment of the orifice plate results in an error in the pressure drop readings between the upstream and downstream side of the orifice fittings and therefore results in erroneous computations of fluid flow rate through the pipeline.

Accordingly, as described above, the eccentricity gauge and orifice plate combination of this invention is designed to test the alignment of orifice plates in orifice fittings by measuring the eccentricity of the path of the eccentricity gauge contact point about the internal orifice fitting bore wall. The dowel pin of the eccentricity gauge is designed to seat in the flow opening of the orifice plate and rotates through a complete revolution with the dial indicator inside the orifice fitting, causing the contact point to traverse the internal bore wall or surface of the orifice fitting and measure the roundness or eccentricity of the path traversed by the indicator contact point. If the dial indicator element of the eccentricity gauge indicates traversal of a substantial circle by the indicator contact point, when the orifice plate is mounted in substantially perpendicular relationship with respect to the flow path of the fluid flowing through the pipeline and concentric to the bore of the orifice plate. However, if the dial indicator indicates an eccentric plate around the inside bore surface of the orifice fitting, then the orifice plate is misaligned in angular relationship or eccentric with respect to the fluid flow path and must be removed and the alignment of the orifice plate corrected inside the orifice fitting.

It is therefore an object of this invention to provide a new and improved eccentricity gauge for measuring the alignment of orifice plates in situ in orifice fittings.

Another object of the invention is to provide a new and improved hub orifice plate for insertion in conventional manner an orifice fitting and an eccentricity gauge having a dowel pin for engaging the flow opening in the hub orifice plate and rotation about the orifice plate and orifice fitting to determine the eccentricity of the measured path and therefore, the alignment of the orifice plate in the orifice fitting.

Still another object of this invention is to provide a new and improved eccentricity gauge having a dowel pin for insertion in the flow opening of an orifice plate, a dowel indicator extending from the dowel pin and fitted with an indicator contact point for contacting the inside bore surface or wall of the orifice fitting and determining the eccentricity or roundness of the path described by the indicating point when the eccentricity gauge describes a complete rotation about the dowel pin, to further determine the alignment of the orifice plate in the orifice fitting.

Yet another object of this invention is to provide an eccentricity gauge and specially designed hub orifice plate for determining the alignment of the orifice plate in an orifice fitting, which hub orifice plate is seated in the orifice fitting in conventional manner and the eccentricity gauge is positioned in the orifice fitting bore with a dowel pin inserted in the orifice plate flow opening and the indicator contact point of a dowel indicator engaging the inside bore surface of the orifice fitting, wherein complete rotation of the eccentricity gauge about the dowel pin determines the roundness or eccentricity of the path described by the indicator contact point to indicate the alignment of the orifice plate in the orifice fitting.

SUMMARY OF THE INVENTION

These and other objects of the invention are provided in a new and improved eccentricity gauge and orifice plate for determining the alignment of orifice plates in orifice fitting, which orifice plate is characterized by a flat, round plate fixture having a center hub projecting from both plate faces for extending the length of the flow opening through the hub. The orifice plate is mounted in an orifice fitting in conventional fashion using a conventional carrier and the eccentricity gauge is characterized in a first preferred embodiment by a dowel pin extending from a mount, which dowel pin is sized for rotational placement in the flow opening of the orifice plate hub and a dial indicator adjustably carried by the mount is positioned with the indicator contact point touching the inside bore surface or wall of the orifice fitting, such that complete rotation of the eccentricity gauge about the inside bore surface determines the eccentricity or roundness of the indicator contact point path and therefore, the alignment of the orifice plate in the orifice fitting. In a second preferred embodiment an adjusting bar extends from the mount and adjustably secures the dial indicator in spaced relationship with respect to the dowel pin to accommodate larger orifice plates.

BRIEF DESCRIPTION OF THE DRAWINGS

The invention will be better understood by reference to the accompanying drawings, wherein:

FIG. 1 is a perspective view of a first preferred embodiment of the eccentricity gauge of this invention;

FIG. 2 is rear view of the eccentricity gauge illustrated in FIG. 1;

FIG. 3 is an exploded view of the eccentricity gauge and hub orifice plate in functional orientation with respect to both a conventional orifice fitting and a specially designed orifice fitting having a hub;

FIG. 4 is a sectional view taken along line 4—4 of the eccentricity gauge illustrated in FIG. 1;

FIG. 5 is a front view of the eccentricity gauge in functional engagement with a conventional orifice plate in an orifice fitting;

FIG. 6 is an exploded view of the eccentricity gauge illustrated in FIG. 1;

FIG. 7 is a perspective sectional view of a second preferred embodiment of the eccentricity gauge and hub orifice plate mounted in an orifice fitting, with the plate carrier removed for brevity;

FIG. 8 is a sectional view taken along line 8-8 of the eccentricity gauge illustrated in FIG. 7;

FIG. 9 is a front view of the eccentricity gauge and hub orifice plate illustrated in FIG. 7; and FIG. 10 is a side view of the eccentricity gauge and hub orifice plate illustrated in FIG. 7.

DESCRIPTION OF THE PREFERRED EMBODIMENTS

Referring initially to FIGS. 1, 2, 4 and 6 of the drawings, in a first preferred embodiment of the invention the eccentricity gauge of this invention is generally illustrated by reference number 1. The eccentricity gauge 1 is characterized by a conventional dial indicator 2 having a transparent indicator face 5, an indicator hand 6 and face numbers 7 mounted in a cylindrical indicator housing 3, with an indicator contact arm 8 projecting from the side of the indicator housing 3. A contact point shaft 10 is spring-loaded in the indicator contact arm 8 in conventional fashion and a contact point 9 terminates the extending end of the contact point shaft 10. A locking bar 12, having a knurled extending end 13, is threadably seated at the opposite end by means of bar threads 13a in the locking bar receptacle 15 of the mount 14. The locking bar 12 is disposed in perpendicular relationship with respect to the indicator contact arm 8, which extends from the indicator housing 3 through an oversized arm receptacle 14a in the mount 14, to facilitate slidable adjustment of the indicator housing 3 of the dial indicator 2 with respect to the mount 14. A dowel pin 18 projects in fixed relationship from the opposite end of the mount 14 from the locking bar 12, for purposes which will be hereinafter further described. Accordingly, the locking bar 12 facilitates sliding adjustment of the dial indicator 2 with respect to the mount 14 and seating of the indicator contact point 9 against the inside bore surface 30 of an orifice fitting 25 with a desired degree of spring tension, as illustrated in FIGS. 3 and 5 and as further hereinafter described.

It will be appreciated from a consideration of FIGS. 3 and 5 that the eccentricity gauge 1 can be used to measure the orientation of a conventional orifice plate 26, illustrated in FIGS. 3 and 5, by inserting the dowel pin 18 in the flow opening 23 of the conventional orifice plate 26 and adjusting the locating bar 12 to locate the indicator contact point 9 against the inside bore surface 30 of the orifice fitting 25 in spring-biased relationship, as illustrated. The eccentricity gauge 1 can then be manipulated in a complete revolution with the contact point 9 describing a curved path about the inside bore surface 30 to indicate whether that path is circular or elliptical. If the path is circular, then the conventional orifice plate 26 is seated concentrically in the bore of the orifice fitting 25 and in a proper position perpendicular to the path of flow of fluid through the orifice fitting 25 and the flow opening 23 of the conventional orifice plate 26. However, if the dial indicator 2 of the eccentricity gauge 1 indicates that the path traversed by the contact point 9 is elliptical, then the conventional orifice plate 26 is seated eccentrically in the orifice fitting 25 flow bore or in angular relationship with respect to the flow path of fluid through the orifice fitting 25 and an adjustment must be made to correct the misalignment of the conventional orifice plate 26.

As further illustrated in FIG. 3, in a most preferred embodiment of the invention a specially designed hub orifice plate 20 is sued with the eccentricity gauge 1 in place of the conventional orifice plate 26 to determine the roundness or eccentricity of the hub orifice plate 20 positioned inside a conventional orifice plate 25. The specially designed hub orifice plate 20 includes a flat plate disc or fixture 21 having a projecting hub 22, through which the flow opening 23 is bored to extend the length of the flow opening 23 and thereby stabilize the dowel pin 18 in the flow opening 23 and facilitate a more precise measurement of the path of the contact point 9 as the contact point 9 of the eccentricity gauge 1 is rotated around the inside bore surface of the orifice fitting 25. The orifice fitting 25 includes a cylindrical inside bore surface 30 which communicates with a pipeline 31. A cap plate 27 fits in a cap plate slot 28 provided in the top segment of the orifice fitting 25 to seal the plate carrier 26a, having a circular plate seat 26b, inside the orifice fitting 25, by means of cap plate bolts 29.

Referring again to FIGS. 1-6 of the drawings, it will be appreciated that the eccentricity gauge 1 so illustrated is designed to fit inside a relatively small orifice fitting 25, such as, for example, an orifice fitting 25 having a 2-inch bore diameter and accommodating a two inch pipeline 27. Accordingly, the locking bar 12 is elongated to facilitate insertion of the eccentricity gauge 1 inside the small bore of the orifice fitting 25 and projecting the dowel pin 18 into the flow opening 23 of the hub orifice plate 20 or conventional orifice plate 26. The locking bar 12 may then be used to rotate the eccentricity gauge in a complete revolution and cause the contact point 9 to describe a corresponding path around the inside bore surface 30 of the orifice fitting 25, to determine the alignment of the hub orifice plate 20 or a conventional orifice plate 26 inside the orifice fitting 25.

Referring now to FIGS. 7-10 of the drawings, the eccentricity gauge 1 may also be designed with an elongated adjusting bar 11, fitted in an arm receptacle 14a provided in the mount 14 and a locking bolt 16, having bolt threads 16a and a knurled knob 17, is designed to facilitate sliding adjustment of the mount 14 on the adjusting bar 11. A housing bracket 4 is also provided on the indicator housing 3 opposite the indicator lens 5 to receive one end of the adjusting bar 11 in fixed relationship and mount the dial indicator 2 on the adjusting bar 11. Accordingly, the contact point 9, extending from the indicator contact arm 8, can be adjustably positioned against the inside bore surface 30 of the orifice fitting 25 when the dowel pin 18 is inserted in the flow opening 23 of the hub orifice plate 20 to describe a complete circular or elliptical path around the inside of an orifice fitting 25 of large diameter.

In a most preferred embodiment of the invention the hub orifice plate 20 is designed such that the hub 22 projects from both faces of the plate fixture 21 to extend the length of the flow opening 25 and accommodate all, or at least substantial portion, of the length of the dowel pin 18. This facility greatly stabilizes the dowel pin 18 in the flow opening 23 and maintains the flat face of the mount 14 laying adjacent the dowel pin 18 parallel to the face of the hub 22, regardless of whether that face of the mount 14 lies against the face of the hub 22. Accuracy of measurement is thus easily insured. However, it will be appreciated that use of the eccentricity gauge 1 in either of the embodiments described herein to measure the attitude of a conventional orifice plate 26 in an orifice fitting 25 requires greater dexterity and care to maintain the flat face of the mount 14 against the corresponding flat face of the conventional orifice plate 26, since the flow opening 23 in the conventional orifice plate 26 is only about 1/8 of an inch in length. Accordingly, there exists considerable latitude of wobble of the dowel pin 18 in the flow opening 23, which can cause the contact point 9 to describe an irregular path about the inside bore surface 30 of the orifice fitting 25, with a resulting inaccurate measurement of the eccentricity gauge 1.

While the preferred embodiments of the invention have been described above, it will be recognized and understood that various modifications may be made in the invention and the appended claims are intended to cover all such modifications which fall within the spirit and scope of the invention.

Having described my invention with the particularity set forth above, what is claimed is:

1. An eccentricity gauge for measuring the alignment of an orifice plate having a flow opening and mounted in an orifice fitting, comprising a dial indicator having an indicator contact point for contacting the inside surface of the orifice fitting, an L-shaped mount having a first leg carrying dial indicator, a second leg extending from said first leg and a pin carried by said second leg of said mount for extending into said flow opening of the orifice plate, whereby rotation of said dial indicator, said indicator contact point and said pin with respect to the orifice plate and the orifice fitting causes said indicator contact point to traverse the inside surface of the orifice fitting and indicate said alignment of the orifice plate in the orifice fitting.

2. The eccentricity gauge of claim 1 further comprising an adjusting bar carried by said mount and receiving said dial indicator for spacing said indicator contact point a selected distance from said pin.

3. The eccentricity gauge of claim 2 wherein said adjusting bar is slidably carried by said mount and further comprising lock means carried by said mount for engaging said adjusting bar and selectively securing said adjusting bar in said mount in slidably adjustable relationship.

4. The eccentricity gauge of claim 3 wherein said lock means further comprises an adjusting bolt threadably seated in said mount in substantially perpendicular alignment with said adjusting bar.

5. The eccentricity gauge of claim 1 wherein said orifice plate further comprises a disc and a hub provided in the center portion of said disc and wherein said flow opening extends through said hub in transverse relationship with respect to the plane of said disc for receiving said pin.

6. The eccentricity gauge of claim 5 further comprising an adjusting bar carried by said mount and receiving said dial indicator for spacing said indicator contact point a selected distance from said pin.

7. The eccentricity gauge of claim 6 wherein said adjusting bar is slidably carried by said mount and fixedly attached to said dial indicator and further comprising lock means carried by said mount for engaging said adjusting bar and selectively securing said adjusting bar in said mount in slidably adjustable relationship.

8. The eccentricity gauge of claim 7 wherein said lock means further comprises an adjusting bolt threadably seated in said mount in substantially perpendicular alignment with said adjusting bar.

9. The eccentricity gauge of claim 1 further comprising an indicator contact arm fixedly carried by said dial indicator for receiving said indicator contact point and wherein said indicator contact arm slidably engages said mount.

10. The eccentricity gauge of claim 9 further comprising lock means carried by said mount for engaging said indicator contact arm and selectively securing said indicator contact arm in said mount in slidably adjustable relationship.

11. The eccentricity gauge of claim 10 wherein said lock means further comprises an adjusting bolt threadably seated in said mount in substantially perpendicular alignment with said indicator contact arm.

12. The eccentricity gauge of claim 11 wherein said orifice plate further comprises a disc and a hub provided in the center portion of said disc and wherein said flow opening extends through said hub in transverse relationship with respect to the plane of said disc, for receiving said pin.

13. An eccentricity gauge for measuring the alignment of an orifice plate having a flow opening and mounted in an orifice fitting, comprising dial indicator means having a spring-loaded indicator contact point for contacting the inside bore surface of the orifice fitting, an elongated adjusting bar fixedly carried by said dial indicator means, a mount carrying plate adjusting bar in slidably adjustable relationship and a dowel pin carried by said mount for removably and rotatably extending into said flow opening of the orifice plate, whereby rotation of plate dial indicator means, said indicator contact point and said dowel pin in concert with respect to the orifice plate and the orifice fitting causes said indicator contact point to traverse the inside bore surface of the orifice fitting and indicate said alignment of the orifice plate in the orifice fitting.

14. The eccentricity gauge of claim 13 further comprising lock means carried by said mount for engaging said adjusting bar and selectively securing said adjusting bar in said mount in said slidably adjustable relationship.

15. The eccentricity gauge of claim 14 wherein said lock means further comprises an adjusting bolt threadably seated in said mount in substantially perpendicular alignment with said adjusting bar.

16. The eccentricity gauge of claim 13 wherein said orifice plate further comprises a disc and a hub provided in the center portion of said disc and wherein said flow opening extends through said hub in transverse relationship with respect to the plane of said disc for receiving said dowel pin.

17. The eccentricity gauge of claim 16 further comprising lock means carried by said mount for engaging said adjusting bar and selectively securing said adjusting bar in said mount in slidably adjustable relationship.

18. The eccentricity gauge of claim 17 wherein said lock means further comprises an adjusting bolt threadably seated in said mount in substantially perpendicular alignment with said adjusting bar.

19. An eccentricity gauge and orifice plate for measuring the alignment of said orifice plate in an orifice fitting, said orifice plate comprising a disc, a hub provided in the center portion of said disc and a flow opening extending through said hub in transverse relationship with respect to the plane of said disc and said eccentricity gauge comprising dial indicator means having an indicator contact point for contacting the inside surface of the orifice fitting, mount means carrying said dial indicator means and pin means carried by said mount means for extending into said flow opening of said orifice plate, whereby rotation of said dial indicator means, said indicator contact point and said pin means with respect to said orifice plate and the orifice fitting causes said indicator contact point to traverse the inside surface of the orifice fitting and indicate plate alignment of said orifice plate in the orifice fitting.

20. The eccentricity gauge and orifice plate of claim 19 further comprising an adjusting bar slidably carried by said mount means and receiving said dial indicator means for spacing said indicator contact point a selected distance from said pin means and lock means carried by said mount means for engaging said adjusting bar and selectively securing said adjusting bar in said mount means in slidably adjustable relationship.

21. The eccentricity gauge and orifice plate of claim 20 wherein said lock means further comprises an adjusting bolt threadably seated in said mount means in substantially perpendicular alignment with said adjusting bar.

22. The eccentricity gauge and orifice plate of claim 19 further comprising an indicator contact arm fixedly carried by said dial indicator means for receiving said indicator contact point and wherein said indicator contact arm slidably engages said mount means.

23. The eccentricity gauge and orifice plate of claim 22 further comprising lock means carried by said mount means for engaging said indicator contact arm and selectively securing said indicator contact arm in said mount means in slidably adjustable relationship.

24. The eccentricity gauge and orifice plate of claim 23 wherein said lock means further comprises an adjusting bolt threadably seated in said mount means in substantially perpendicular alignment with said indicator contact arm.

* * * * *